United States Patent [19]

Müller

[11] Patent Number: 5,058,644
[45] Date of Patent: Oct. 22, 1991

[54] V-SHAPE STUD LINK FOR A TIRE CHAIN AND TIRE CHAINS USING SAME

[75] Inventor: Anton Müller, Aalen, Fed. Rep. of Germany

[73] Assignee: Eisen-und Drahtwerk Erlau Aktiengesellschaft, Aalen, Fed. Rep. of Germany

[21] Appl. No.: 417,530

[22] Filed: Oct. 5, 1989

[30] Foreign Application Priority Data

Oct. 5, 1988 [DE] Fed. Rep. of Germany ....... 3833871

[51] Int. Cl.$^5$ ............................................. B60C 27/20
[52] U.S. Cl. .................................... 152/243; 152/239; 152/231; 152/244
[58] Field of Search ................. 152/241, 242, 213 R, 152/213 A, 231, 239, 243, 244, 245; 59/73, 84

[56] References Cited

U.S. PATENT DOCUMENTS

| 3,111,155 | 11/1963 | Roland | 152/239 |
| 3,282,318 | 11/1966 | Nylund | 152/243 |
| 4,947,912 | 8/1990 | Weidler | 152/243 |

FOREIGN PATENT DOCUMENTS

| 1605607 | 1/1970 | Fed. Rep. of Germany | 152/241 |
| 112503 | 11/1944 | Sweden | 152/239 |

*Primary Examiner*—Michael W. Ball
*Assistant Examiner*—Gregory J. Wilber
*Attorney, Agent, or Firm*—Robert W. Becker & Associates

[57] ABSTRACT

A stud-like link and tire chain using same. Each stud-like link has at least two link portions that extend at an angle to one another. The tire chain has an outer and inner portion that are interconnected by a surface contact portion that at least in part comprises such stud-like links. At least one of the link portions of the stud-like link extends at an angle to the circumferential direction of the surface contact portion of the chain.

21 Claims, 4 Drawing Sheets

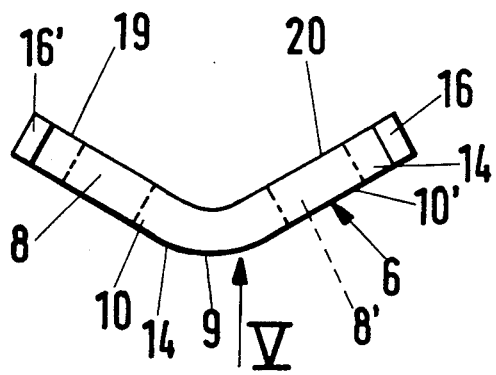
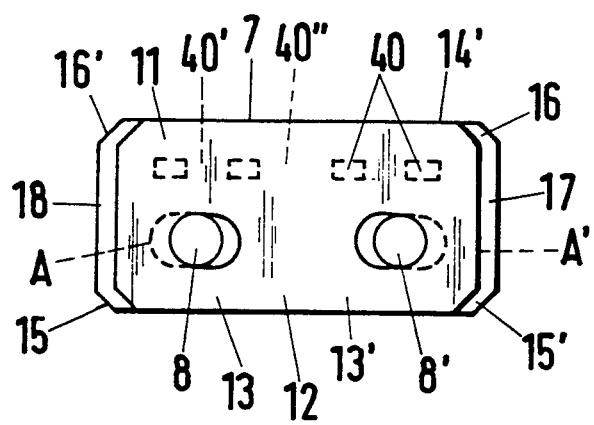
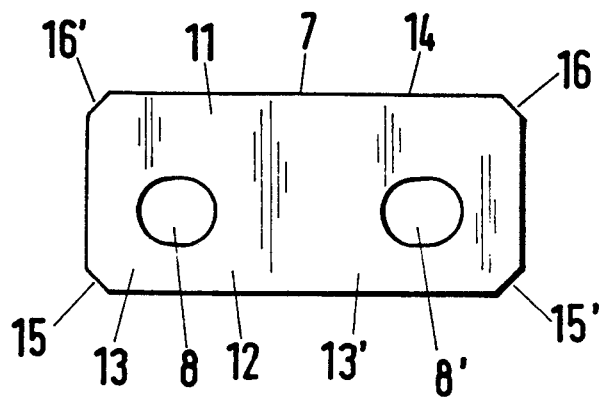

V-SHAPE STUD LINK FOR A TIRE CHAIN AND TIRE CHAINS USING SAME

BACKGROUND OF THE INVENTION

The present invention relates to a stud-like link for a tire chain, including a link body having at least one mounting opening for chain links, with the stud-like link being adapted to be provided between a tire contact surface and a ground contact surface. The present invention also relates to a tire chain having an outer and inner portion that are interconnected by a surface contact portion that at least in part comprises such stud-like links.

With one known tire chain, the surface contact portion of the chain is provided with stud-like links that have a linear and plate-like configuration. These stud-like links can become jammed in the grooves or recesses of the tire profile. In addition, especially when driving down hills and during braking, such linear stud-like links act in a ski or skid-like manner, resulting in a so-called skate effect where the tire chain slips on the ground.

It is therefore an object of the present invention to provide a stud-like link and a tire chain of the aforementioned general type where a jamming of the stud-like links and a slipping of the chain are reliably prevented.

BRIEF DESCRIPTION OF THE DRAWINGS

This object, and other objects and advantages of the present invention, will appear more clearly from the following specification in conjunction with the accompanying schematic drawings, in which:

FIG. 4 is a plan view of one exemplary embodiment of the inventive stud-like link of a tire chain of the present invention, and is taken in the direction of the arrow IV in FIG. 5;

FIG. 5 shows the stud-like link of FIG. 4 taken in the direction of the arrow V in FIG. 4; and FIG. 6 shows the stud-like link of FIGS. 4 and 5 in a flat state.

SUMMARY OF THE INVENTION

The stud-like link of the present invention is characterized primarily in that it has two link portions that extend at an angle to one another.

The tire chain of the present invention is characterized primarily in that at least one of the link portions of each stud-like link extends at an angle to the circumferential direction of the surface contact portion of the chain.

The inclination of the link portions prevents the stud-like links from extending into the grooves of the tire profile and becoming jammed there when the tire chain is mounted on the tire. In addition, as a result of the inclination of the link portions, additional braking and traction forces are transmitted, since the stud-like links cannot act in a skid-like manner as do the heretofore known tire chains. The inventive configuration of the stud-like links has the further advantage that the wear volume, and hence the service life of the tire chain as well as the lateral stability thereof when driving through curves and on inclined planes, are increased. Since the inventively embodied stud-like links have a greater support surface than do conventional linear stud-like links, the tire is also better protected. Finally, the traction of the inventive stud-like links is increased, and the danger that they can tilt is decreased, so that additional gripping elements can be eliminated and the stud-like links are uniformly worn.

Further specific features of the present invention will be described in detail subsequently.

DESCRIPTION OF PREFERRED EMBODIMENTS

Figure 1:
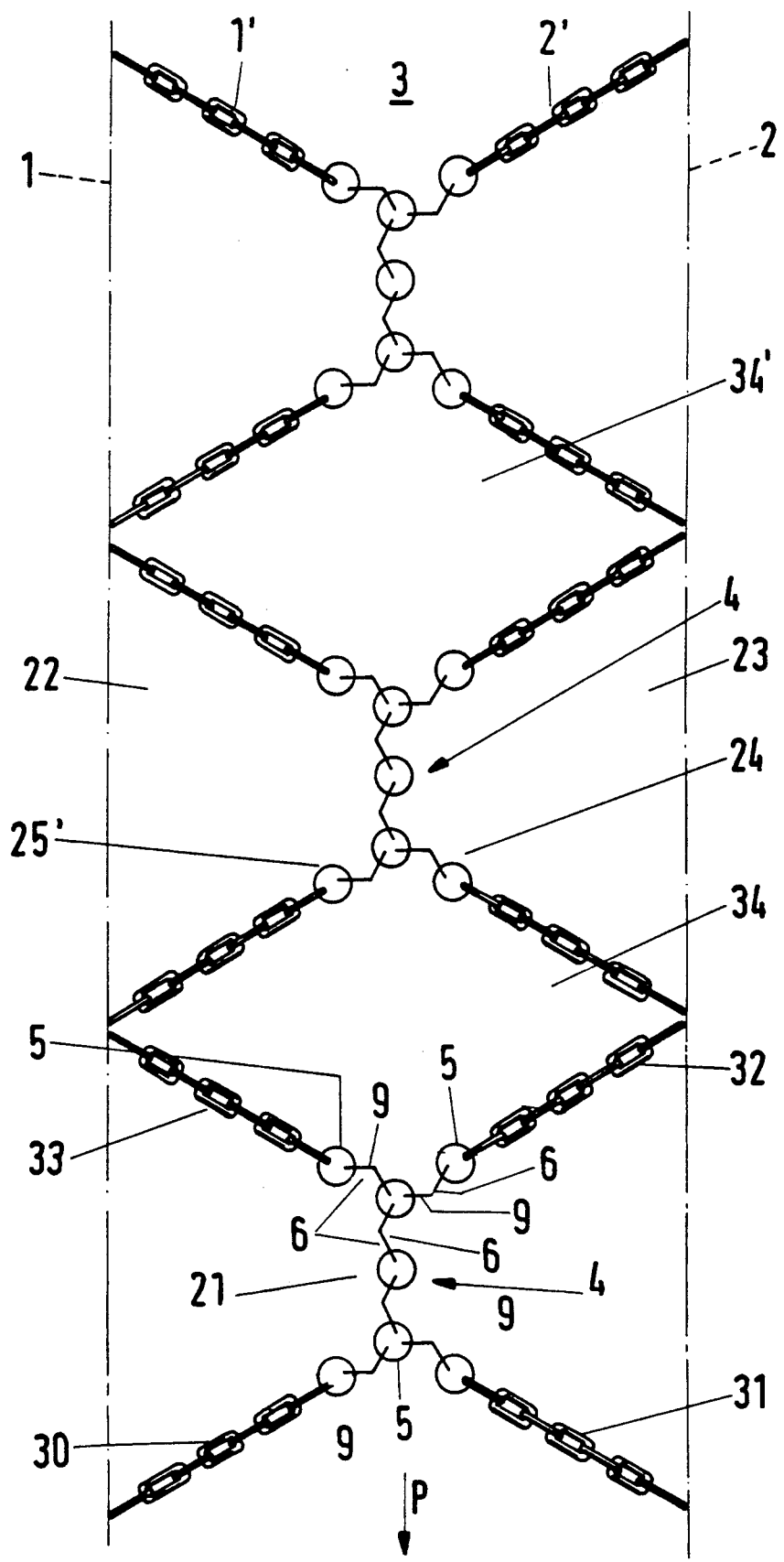
FIG. 1 is a plan view of a first exemplary embodiment of the inventive tire chain.
Figure 2:
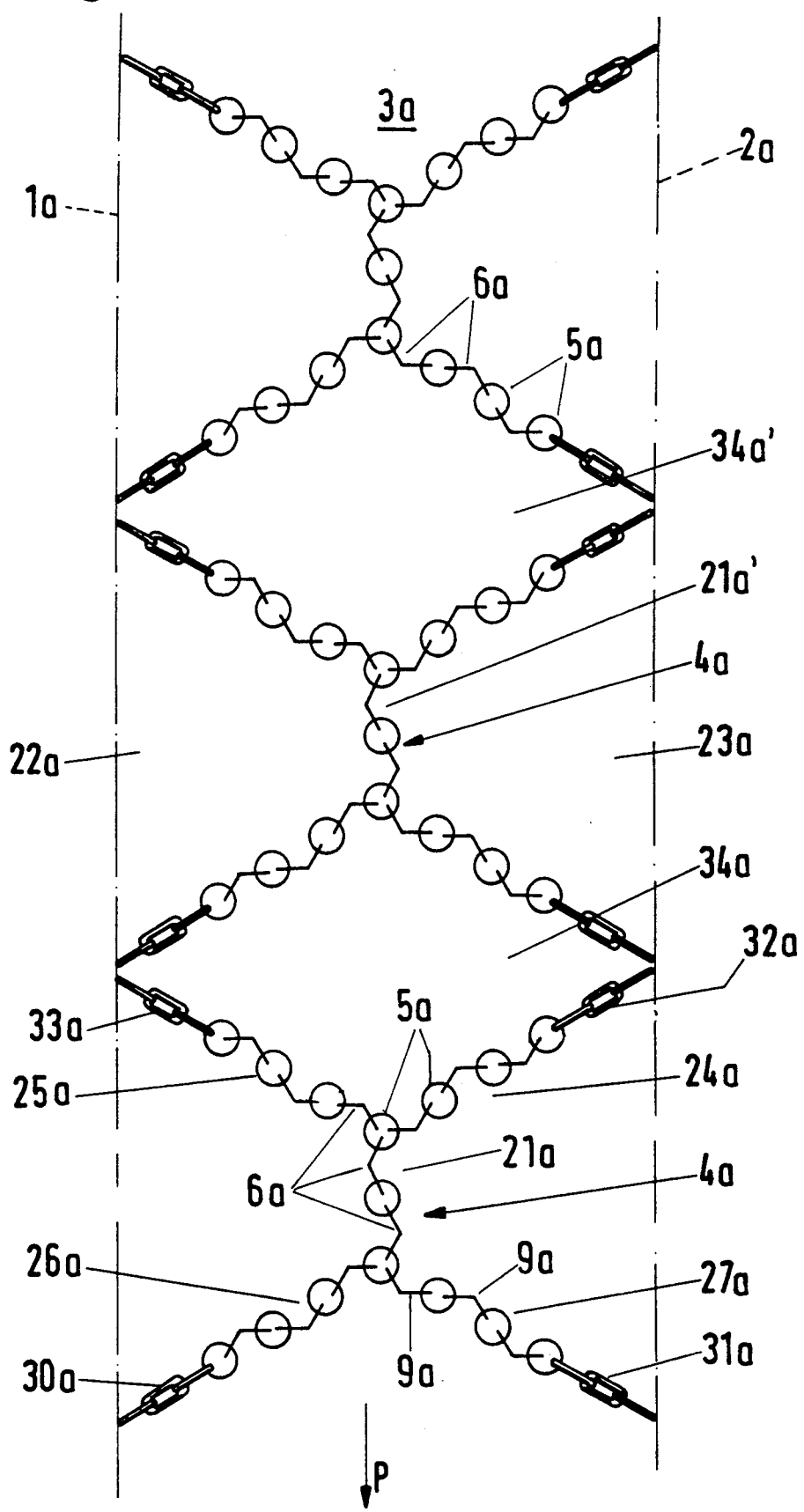
FIG. 2 is a plan view of a second exemplary embodiment of the inventive tire chain.
Figure 3:
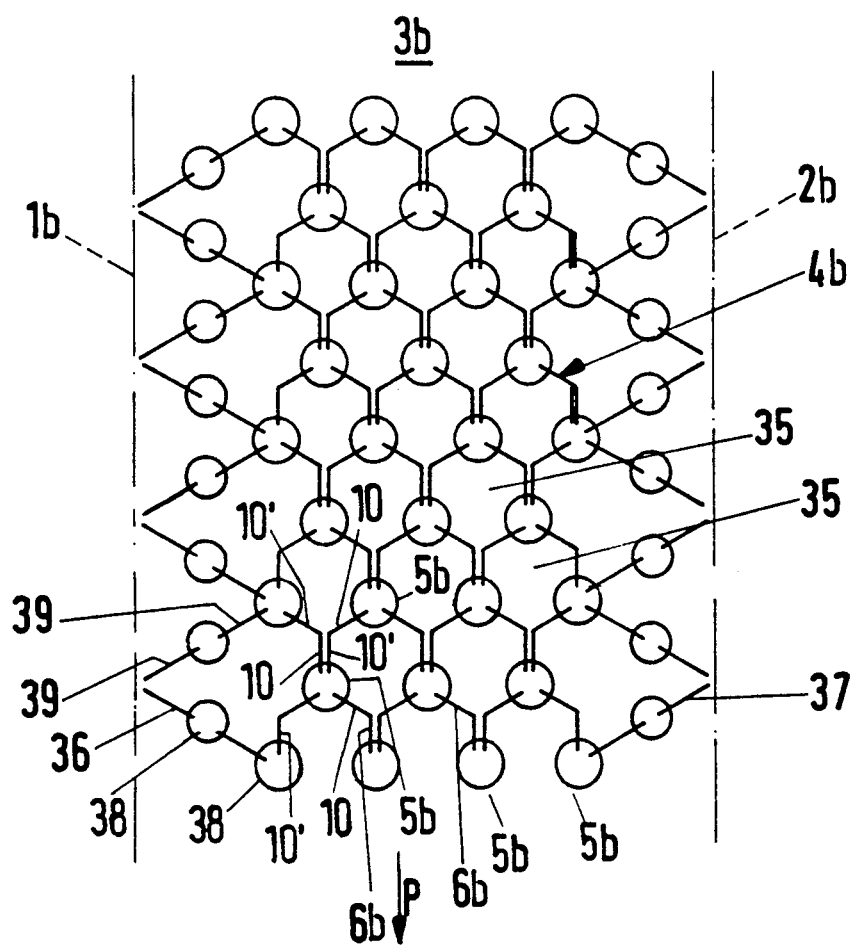
FIG. 3 is a plan view of a third exemplary embodiment of the inventive tire chain showing the surface contact portion thereof.

Referring now to the drawings in detail, the tire chains illustrated in FIGS. 1 to 3 comprise side portions 1, 1a, 1b and 2, 2a, 2b, which are indicated by dot-dash lines and which are interconnected via a surface contact portion 3, 3a, 3b of the chain. The side portions can be chain meshes, chain strands, wire cables, plastic cables, resilient straps, etc. The surface contact portions 3, 3a of FIGS. 1 and 2 are provided with central tie portions 4, 4a that in the circumferential direction P of the surface contact portion are disposed one after the other, and that are connected to the side portions 1, 1a; 2, 2a via transverse chains 1', 2'. The surface contact portion 3b of the tire chain of FIG. 3 is provided with a central tie portion 4b that is comprised of conventional horizontal annular links 5b, and stud-like links 6b.

The stud-like links provided for the tire chains of FIGS. 1 to 3 will be described in detail subsequently with the aid of FIGS. 4 to 6. In the view of FIG. 5, the stud-like link 6 is provided with an essentially rectangular, plate-like link body 7 that preferably has two mounting openings 8, 8' for the annular links 5 that are to be attached. The annular links are preferably embodied as round links, although they could also have an oval or elongated shape. The stud-like link 6 can be a stamped or forged part. The stamped stud-like links are suitably advantageous for snow chains for passenger cars and trucks, for traction chains for snow-removal vehicles and cross-country vehicles, and for tire protection chains for construction machinery. The forged stud-like links are particularly suitable for use with so-called angular lug chains for heavy earthmoving vehicles.

The stud-like links 6, i.e. its link body 7, is bent in the central portion in such a way that two equal link portions 10, 10' are formed that merge with one another via a bending edge 9 (FIG. 4). As shown in FIG. 4, the angle between the two equal link portions is 120°. Each of the link portions 10, 10' is provided with one of the mounting openings 8, 8'. These mounting openings are preferably oblong and are disposed in such a way that with respect to the facing inner sides 19, 20 of the link portions 10, 10', the mounting openings are disposed in the central portion of the link portions. The longitudinal axes A, A' (FIG. 5) of the mounting openings 8, 8' are disposed parallel to and at a distance from the longitudinal central plane of the link body 7 (FIGS 5, 6). As a result, in the position illustrated in FIG. 5, a wider link body portion 11 is formed above the mounting openings 8, 8', and a narrower link body portion 12 is formed below the mounting openings. The link body portion 11 forms a wear portion, whereas the other link body portion 12 of the stud-like link 6 is in the link structure and rests against the tire when the chain is mounted. When the chain is mounted, those longitudinal edges 14, 14' of the link portions 10, 10' in the link body portion 11 form wear surfaces via which the stud-like link rests against the ground, whereas the opposite, parallel longitudinal edges 13, 13' form tire-abutment surfaces. In order to provide a large wear volume the link body portion 11 is nearly twice as wide as the link body portion 12.

The corners of the link body 7 are preferably formed by chamfered edges 15, 15', 16, 16' that extend at an angle of approximately 45° to the adjacent longitudinal edges 13, 13' and 14, 14' and to the adjoining ends 17, 18. The height of the chamfered edges 15, 15', 16, 16' is preferably about ⅛ to 1/9 of the height of the link body 7 and approximately ⅓ of the maximum height of the mounting openings 8, 8'. The length of the link body 7 is preferably somewhat greater than twice the height thereof. The thickness of the stud-like links 6 is less than ¼ of the height thereof. In the flat state shown in FIG. 6, the stud-like link 6 preferably has a length of 60 mm, a height of 26 mm, and a thickness of 6 mm. The height of the chamfered edges 15, 15', 16, 16' is preferably 3 mm. The mounting openings 8, 8' are preferably 12 mm long and have a maximum inside width of 9 mm. In place of the oblong mounting openings 8, 8', the stud-like link 6 could also be provided with round mounting openings. In place of two mounting openings, it would also be possible to provide only a single, elongated mounting opening for the annular links 5.

When stamped, the stud-like link 6 can be provided along the longitudinal edges 14, 14' with teeth or other profilings in order to increase traction. The stud-like link can also, as indicated by dashed lines in FIG. 5, be provided with recesses 40 that are spaced from the ground contact surface 14, 14'. If the stud-like link becomes worn to the level of these recesses, then the portions 40', 40" remaining between the recesses form studs that again assure traction of the stud-like link even when it is partially worn away. The recesses 40 can be provided with a planar or profiled wear or ground contact side. When the stud-like link is forged, the wear zones can be profiled in conformity with the intended application.

In the tire chain of FIG. 1, the tie portions 4 comprise three annular links 5 and six stud-like links 6 of the type illustrated in FIGS. 4 to 6. Engaging each end link 5 of each tie portion 4 are three stud-like links 6, one of which extends in the circumferential direction of the surface contact portion 3 while the other two stud-like links extend at an angle toward the sides. Attached to these inclined stud-like links 6, via an annular link 5, is a respective transverse chain 30 to 33. As a consequence of the described configuration, the tie portions 4 have the approximate shape of a double Y. The stud-like links 6 at the end of the tie portion that extend at an angle to the sides are disposed in such a way that the bending edges 9 of the stud-like links that are on the side of the side portion 1 face away from one another, while the bending edges 9 of the stud-like links that are disposed on the side of the side portion 2 face one another. This assures a uniform and good behavior as well as a quiet running of the tire chain.

Those stud-like links 6 of the tie portion 21 of each tie portion 4 that are disposed one after the other in the circumferential direction of the surface contact portion 3 are arranged in the same way. In the embodiment illustrated in FIG. 1, the bending edges 9 of these stud-like links 6 face the side portion 1. It is to be understood that it is also possible for the bending edges 9 to be directed toward the side portion 2. Similarly, these stud-like links within the tie portion 21 can be turned by 180° relative to one another.

The transverse chains 30 to 33 could also be formed from the annular links 5 and the stud-like links 6. However, in the illustrated embodiments these transverse chains are formed by oblong or oval chain links. The annular links 5 at the ends of each tie portion 4' and the inclined stud-like links 6 that are attached to these annular links 5, delimit, together with the transverse chains 30 to 33, diamond-shaped chain meshes 34, 34' that are consecutively arranged and are spaced from one another in the circumferential direction, and are interconnected by the tie portions 4. The chain meshes 34, 34' extend over the entire width of the surface contact portion 3. The tie portions 4 furthermore delimit, together with the transverse chains 30 to 33 and the side portions 1, 2, respective trapezoidal chain meshes 22, 23 that are disposed across from one another on both sides of the tie portions 4.

In the embodiment illustrated in FIG. 2, the transverse chains, over at least half their length, are also part of the tie portions 4a, which again have the shape of a double Y. In contrast to the embodiment of FIG. 1, the legs 24a to 27a of the tie portions 4a are longer. In conformity therewith, the transverse chains 30a to 33a are considerably shorter than are the chain strands 30 to 33 of the embodiment of FIG. 1.

Those portions 21a of the tie portions 4a that extend in the circumferential direction of the surface contact portion 3a are, just like the tie portions 21, comprised of three annular links 5a and two stud-like links 6a. The adjacent stud-like links 6a in the tie portion 21a are turned by 180° relative to one another. However, these stud-like links could also be disposed in the same direction as in the embodiment of FIG. 1.

The legs 24a to 27a of the tie portion 4a are each comprised of three annular links 5a and three stud-like links 6a. The stud-like links are disposed in such a way that their bending edges 9a alternately point in opposite directions at an angle to the circumferential direction P. The stud-like links 6a of the tie portions 4a are preferably disposed in such a way that they form a zig-zagged course. The legs 24a to 27a and the adjoining transverse chains 30a to 33a delimit, together with the tie portion 21a, diamond-shaped chain meshes 34a, 34a' as in the tire chain of FIG. 1. These diamond-shaped chain meshes are successively arranged in the circumferential direction P and are interconnected by the portions 21a, 21a' of the tie portions 4a. Furthermore, the tie portions 4a, together with the transverse chains 30a to 33a and the side portions 1a, 2a, delimit trapezoidal chain meshes 22a, 23a. With the exception of the described configuration of the tie portions 4a, the tire chain of FIG. 2 corresponds completely to the tire chain of FIG. 1. With the embodiment of FIG. 2, a high traction is achieved over nearly the entire width of the surface contact portion 3a since the legs 24a to 27a of the tie portions 4a extend nearly to the side portions 1a, 2a. The legs 24a to 27a could also extend all the way to the side portions 1a, 2a so that an optimum traction is achieved.

The tire chains of FIGS. 1 and 2 form snow and traction chains of so-called cross-track configuration, and have a high traction and service life.

In the embodiment illustrated in FIG. 3, the surface contact portion 3 is formed by a fine-meshed chain network. For this reason, this embodiment is particularly suitable for tire protection and traction chains. The surface contact portion 3b is formed by alternating annular links 5b and stud-like links 6b. The links 5b, 6b are disposed in such a way that the surface contact portion comprises identical, honeycombed, hexagonal chain meshes 35 that are spaced from and successively follow one another in the circumferential direction P, and are also disposed in rows at right angles to this circumferential direction.

Four stud-like links 6b are attached to each annular link 5b, with two of these stud-like links being disposed in such a way that they have one link portion 10, 10' thereof extending parallel to one another, with the other link portions extending outwardly in opposite directions and being connected with further annular links 5b. The other stud-like links 6b that are attached to the annular link 5b have link portions 10' and 10 attached to the annular link in such a way that the link portions extend in a V-shaped manner relative to one another.

The stud-like links 6b in the rows that are provided at right angles to the circumferential direction P are disposed in such a way that they are mirror symmetrical to the circumferential direction, with each two adjacent stud-like links forming a Y-shaped configuration. In the following row, the stud-like links are disposed in the same manner, but are offset relative to the first row in such a way that the parallel link portions 10 10' are directed toward spaces between the parallel link portions of the stud-like links of the adjacent row.

As was the case with the embodiments of FIGS. 1 and 2, the surface contact portion 3b of the embodiment of FIG. 3 is connected via chain strands 36, 37 to the side portions 1b, 2b, with these chain strands being formed by annular links 38 and straight chain links 39. The annular links 38 correspond to the annular links 5b of the tie portion 4b, while the links 39 have a conventional linear configuration. The tire chain of FIG. 3 is preferably a traction and tire protection chain that as a consequence of the fine chain meshes assures a high degree of protection of the tire when the chain is mounted thereon.

As a consequence of the angular configuration of the stud-like links 6, 6a, 6b, tire chains that are provided with these angular stud-like links in the surface contact portion can assure that the tire profile provided with such a tire chain has nearly a four times greater coverage. In a straightforward manner, this reliably prevents the stud-like links from extending into the recesses or grooves of the tire profile and becoming jammed therein. The angular configuration of the stud-like links has the further advantage that even those stud-like links that are disposed in the direction of travel cannot act as skids on snow and ice; rather, due to the angular configuration, additional braking and traction forces will be transmitted. Finally, due to the angular configuration of the stud-like links the wear volume thereof is increased, as a result of which a greater hardened surface can be provided so that the stud-like links have a longer service life. When driving through curves and on inclined planes, the angular configuration improves the lateral stability, since the stud-like links are less likely to tilt. This reduced danger of tilting has the additional advantage that the stud-like links are not worn at an angle but rather uniformly. In addition, due to the smooth configuration of the stud-like links described in conjunction with FIGS. 4 to 6, a good self-cleaning effect is achieved.

The angular stud-like links additionally provide a large tire abutment surface, so that the tires are to a great extent protected. Additional gripping studs or elements can also be eliminated since the inventive stud-like links already by themselves assure an adequately high traction. With the stud-like links of FIGS. 4 to 6, the connecting links do not have to be round, but could also be oval. With the known tire chains comprised of annular and linear stud-like links, the support of the tire chains is effected via the annular links; due to the uniform connection of the annular links and the inventive angularly embodied stud-like links, the braking or tensile strength is considerably increased.

As a consequence of the angular configuration of the stud-like links 6, 6a, 6b, a small number only of chain links is required for a prescribed chain configuration. For example, with the embodiment of FIG. 3, to form the hexagonal chain meshes 35, it is necessary to have only seven chain links, whereas with conventional linear annular links, twelve chain links are needed. As a result, mounting of the inventive tire chain is simplified. Due to the lower number of chain links, the inventive tire chains also have a low weight. However, despite the low number of chain links, the inventive chain link can have a very fine-meshed chain network, as shown by the embodiment of FIG. 3.

The present invention is, of course, in no way restricted to the specific disclosure of the specification and drawings, but also encompasses any modifications within the scope of the appended claims.

What I claim is:

1. A V-shaped stud link for a tire chain comprising a link body which has provided two mounting openings for further chain links between a tire contact surface and a ground contact surface and consists of two link portions that extend at an angle to one another, with said link portions each having a rectangular contour, being of equal length and being provided with chamfered corners that have a height, as measured perpendicular to a longitudinal direction of said link body, of less than 1/6 of the height of said link body.

2. A stud link according to claim 1, in which said angle at which said link portions extend is 120°.

3. A stud link according to claim 1, in which said mounting openings are oval and extend in a longitudinal direction of said stud link.

4. A stud link according to claim 3, in which said mounting openings have major axes that are spaced from a longitudinal central plane of said stud link.

5. A stud link according to claim 1, in which said ground contact surface is profiled with projection means in the form of teeth.

6. A stud link according to claim 1, in which at least one recess is provided in a region between said mounting opening and said ground contact surface.

7. A stud link according to claim 6, in which several of said recesses are provided adjacent to one another but spaced apart from each other.

8. A tire chain having an outer and inner portion that are interconnected by a surface contact portion that comprises tie portions and transverse chain strands, which tie portions are at least partially formed by V-shaped stud links, that have two link portions that extend from a bending edge at an angle to one another, and are connected to said transverse chain strands, with said stud links having two link portions of equal length; with said tie portions being arranged one after another in a circumferential direction of a tire and further comprising annular links, which are connected to one another by said stud links in said circumferential direction of said tire and form a circumferential chain portion of said tie portions such that said circumferential chain portions are arranged centered with respect to a width of said tire.

9. A tire chain according to claim 8 in which said tie portion has transverse leg portions extending from each end of said circumferential chain portion of said tie portion to said transverse chain strands, which are connected to said outer and inner portions.

10. A tire chain according to claim 8, in which said circumferential chain portion comprises at least three annular links and two stud links, with said bending edges of said stud links facing in a same direction.

11. A tire chain according to claim 8, in which said circumferential chain portion comprises at least three annular links and two stud links, with said bending edges of said stud links facing in an opposite direction.

12. A tire chain according to claim 8, in which said bending edges of said stud links of said tie portions are facing in the same direction.

13. A tire chain according to claim 8, in which said bending edges of said stud links of said tie portions are facing in an opposite direction.

14. A tire chain according to claim 9, in which said stud links of said circumferential chain portions and of said transverse leg portions of said tie portions follow a zig-zagged course.

15. A tire chain according to claim 8, in which said tie portions together with said transverse chain strands delimit diamond-shaped chain meshes.

16. A tire chain according to claim 14, in which said chain meshes extend over the entire width of said surface contact portion of said tire chain.

17. A tire chain according to claim 8, in which said tie portions, together with said transverse chain strands and said outer and inner portions, delimit trapezoidal chain meshes.

18. A tire chain according to claim 8, in which said tie portion is formed by a chain network of meshes each having n sides formed by n+1 links thereby yielding chain meshes and mesh openings of the same size, said links comprising said annular links and said stud links.

19. A tire chain according to claim 17, in which said stud links that are disposed successively in a direction transverse to a circumferential direction of said tie portion, are disposed mirror-invertedly relative to one another.

20. A tire chain according to claim 17, in which two parallel link portions of two adjacent said stud links are connected in a given one of said annular links, and the two other link portions of said adjacent stud links are directed away from one another in a Vshaped manner and are respectively connected in one said annular link that in said circumferential direction of said tie portion is disposed rearwardly of said given one annular link.

21. A stud link according to claim 8, in which said angle, at which said link portions extend, is 120°.

* * * * *